No. 667,324. Patented Feb. 5, 1901.
G. M. LANE.
SHADE HOLDER FOR ELECTRIC LAMPS.
Application filed Sept. 17, 1900.
(No Model.)

Witnesses
Jno Smith
John F. Robb

Inventor
George M. Lane.

By R. S. & A. B. Lacey. Attorneys

THE NORRIS PETERS CO., PHOTO-LITHO., WASHINGTON, D. C.

UNITED STATES PATENT OFFICE.

GEORGE M. LANE, OF NEWARK, NEW JERSEY, ASSIGNOR TO M. SAMUEL KAMM, OF SAME PLACE.

SHADE-HOLDER FOR ELECTRIC LAMPS.

SPECIFICATION forming part of Letters Patent No. 667,324, dated February 5, 1901.

Application filed September 17, 1900. Serial No. 30,324. (No model.)

*To all whom it may concern:*

Be it known that I, GEORGE M. LANE, a citizen of the United States, residing at Newark, in the county of Essex and State of New Jersey, have invented certain new and useful Improvements in Shade-Holders for Electric Lamps; and I do hereby declare the following to be a full, clear, and exact description of the invention, such as will enable others skilled in the art to which it appertains to make and use the same.

This invention provides a shade-holder designed most especially for electric-arc lamps, although adapted for general use to secure a globe or like part to any style of lamp, electric or otherwise, in such a manner as to admit of the globe being easily and quickly placed in position or removed and which will prevent its casual displacement when properly positioned.

For a full description of the invention and the merits thereof and also to acquire a knowledge of the details of construction of the means for effecting the result reference is to be had to the appended description and drawings hereto attached.

While the essential and characteristic features of the invention are necessarily susceptible of modification, still the preferred embodiment of the invention is illustrated in the accompanying drawings, in which—

Figure 1:
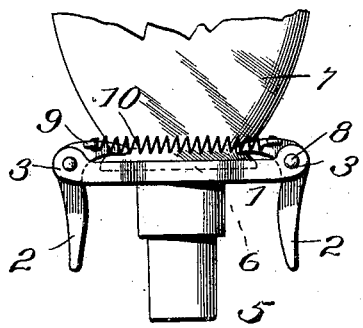
Figure 2:
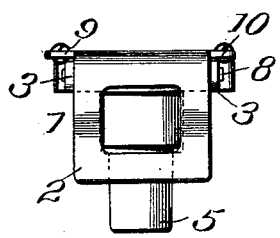
Figure 3:
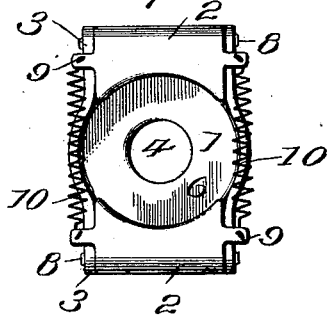
Figure 4:
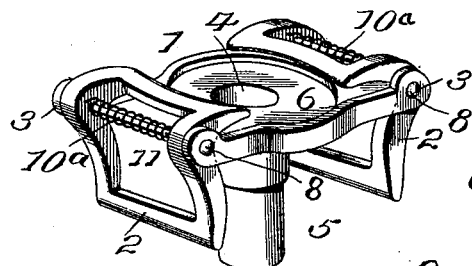

Figure 1 is a side elevation of the holder, showing the shade or globe in position, the upper portion of the shade being broken away. Fig. 2 is a front view of the holder as it appears when seen from a point about at a right angle to Fig. 1. Fig. 3 is a top plan view. Fig. 4 is a perspective view of a modification.

Corresponding and like parts are referred to in the following description and indicated in all the views of the drawings by the same reference characters.

The holder consists, essentially, of a plate 1 and spring-actuated clamps 2, pivotally connected with opposite ends thereof. The plate 1 is of oblong formation and is provided at opposite ends with pairs of ears 3, between which the clamps 2 are pivotally mounted. The plate is centrally apertured, as shown at 4, and a shank 5 is pendent therefrom in line with the opening and is adapted to be received in the holder of the ordinary arc-lamp, thereby adapting the latter to be inclosed. The plate is recessed in its top side, as shown at 6, to form a seat for the shade or globe 7, whereby the latter is held from lateral displacement.

The clamps 2 are of similar formation and correspond in width to the plate 1, so as to extend approximately from one side thereof to the other. In edge view the clamps are approximately of elbow form and are disposed with their long arms vertical and their short arms horizontal and facing inward, so as to engage over the outer flange at the lower end of the shade or globe 7. These clamps 2 are mounted upon rods 8, supported at their ends in corresponding ears 3. Lugs 9 project outwardly in opposite directions from the jaws of the clamps 2, and the ends of coil-springs 10 are connected therewith, said springs serving to cause the jaws of the clamps to engage over the base portion of the shade, globe, or analogous part and hold it upon the base-plate 1. The edges of the jaws are made concave to conform approximately to the circular outline of the shade, globe, or kindred part to be held upon the plate 1, thereby enabling the jaws to obtain an extended bearing against the sides of the part to be secured thereby. The springs 10, in addition to their function of causing the jaws to engage positively with the shade or globe, likewise serve to prevent lateral displacement of the shade, since they extend across the space formed between the jaws and are adapted to bear against opposite sides of the shade or globe. The pendent portions of the clamps when pressed inward against the tension of the springs 10 effect a corresponding outward movement of the jaws, thereby permitting the shade 7 or analogous part either to be placed in position upon the plate 1 or to be removed therefrom, as desired. When the clamps are released from the pressure of the hand, the springs 10, regaining their normal position, move the jaws inward toward each other, so as to engage over the base portion of the shade and retain it in position.

In the form of holder shown in Fig. 4 the clamps are cut away in line with the rods 8, so as to receive coil-springs 10ª, which are mounted upon the rods 8 in the spaces 11, formed by cutting away the clamps, as stated. One end of each spring $10^a$ is secured to the rod 8, upon which it is mounted, and the opposite end is attached to the adjacent clamp 2. The normal tendency of the springs $10^a$ is to force the clamps of the jaws inward in a manner similar to the springs 10 and for a like purpose. The latter construction is more compact and for this reason is preferred in many instances.

Having thus described the invention, what is claimed as new is—

1. In a holder of the character described, a base-plate having offstanding ears at opposite ends, rods supported by said ears, clamps pivotally mounted upon the rods, and springs adapted to force the jaws of the clamps inward and toward each other, substantially as set forth.

2. In combination, a plate having a recess in its top side, a centrally-disposed opening, and a pendent shank 5 in line with the said opening, and spring actuated clamps pivotally connected to opposite ends of the plate, as and for the purpose set forth.

3. In combination, a base-plate, clamps pivotally connected to opposite ends of said plate, and springs connecting the jaws of the clamps and spanning the space formed between them and adapted to supplement the action of the jaws and prevent lateral displacement of the shade, or part placed upon the plate, substantially as set forth.

4. In combination, a base-plate, clamps pivotally connected with opposite ends of the base-plate and provided with oppositely-extending lugs at their upper or jaw ends, and springs connecting corresponding lugs of the jaws of the clamps, substantially as specified.

In testimony whereof I affix my signature in presence of two witnesses.

GEORGE M. LANE. [L. S.]

Witnesses:
ADOLPH ALTMAN,
J. EDWARD SMITH.